US009731911B2

(12) United States Patent
Fahldieck et al.

(10) Patent No.: US 9,731,911 B2
(45) Date of Patent: Aug. 15, 2017

(54) ADJUSTABLE CONTAINER HANDLING DEVICE FOR HANDLING CONTAINERS, SUCH AS BEVERAGE BOTTLES

(71) Applicants: Andreas Fahldieck, Idar-Oberstein (DE); Andreas Krieg, Dittelsheim-Hessloch (DE); Nils Mallitzki, Simmern (DE)

(72) Inventors: Andreas Fahldieck, Idar-Oberstein (DE); Andreas Krieg, Dittelsheim-Hessloch (DE); Nils Mallitzki, Simmern (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 15/170,452

(22) Filed: Jun. 1, 2016

(65) Prior Publication Data

US 2016/0347556 A1    Dec. 1, 2016

Related U.S. Application Data

(63) Continuation-in-part of application No. PCT/EP2014/076060, filed on Dec. 1, 2014.

(30) Foreign Application Priority Data

Dec. 2, 2013 (DE) .......................... 10 2013 113 292

(51) Int. Cl.
*B65G 47/04* (2006.01)
*B65G 47/84* (2006.01)
(Continued)

(52) U.S. Cl.
CPC ........... *B65G 47/846* (2013.01); *B65G 29/00* (2013.01); *B65G 47/847* (2013.01);
(Continued)

(58) Field of Classification Search
CPC .............................. B65G 29/00; B65G 47/847
(Continued)

(56) References Cited

U.S. PATENT DOCUMENTS 2,324,312 A * 7/1943 Meyer .................... B67B 3/003
                                                          198/463.4
5,082,105 A * 1/1992 Tincati ................. B65G 47/846
                                                          198/473.1
(Continued)

FOREIGN PATENT DOCUMENTS

DE         26 23 309         12/1977
DE         31 43 511         5/1983
(Continued)

*Primary Examiner* — Douglas Hess
(74) *Attorney, Agent, or Firm* — Nils H. Ljungman & Associates

(57) ABSTRACT

An adjustable container handling device for handling containers, such as beverage bottles. The abstract of the disclosure is submitted herewith as required by 37 C.F.R. §1.72(b). As stated in 37 C.F.R. §1.72(b): A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims. Therefore, any statements made relating to the abstract are not intended to limit the claims in any manner and should not be interpreted as limiting the claims in any manner.

20 Claims, 8 Drawing Sheets

(51) Int. Cl.
*B65G 47/86* (2006.01)
*B65G 29/00* (2006.01)

(52) U.S. Cl.
CPC ............. *B65G 2201/0241* (2013.01); *B65G 2201/0244* (2013.01); *B65G 2201/0252* (2013.01); *B65G 2207/08* (2013.01)

(58) Field of Classification Search
USPC ..... 198/473.1, 474.1, 803.9, 803.11, 867.08, 198/867.11
See application file for complete search history.

(56) References Cited

U.S. PATENT DOCUMENTS

| | | | | |
|---|---|---|---|---|
| 5,404,227 | A * | 4/1995 | Sumita | B07C 5/126 198/343.1 |
| 6,938,753 | B2 * | 9/2005 | Bonatti | B65G 47/847 198/470.1 |
| 7,007,793 | B2 * | 3/2006 | Stocchi | B65G 29/00 198/473.1 |
| 8,418,836 | B2 * | 4/2013 | Papsdorf | B65G 29/00 198/471.1 |
| 8,561,783 | B2 * | 10/2013 | McAllister | B65G 47/846 198/473.1 |
| 9,181,043 | B1 * | 11/2015 | Goudy | B65G 29/00 |
| 9,302,856 | B2 * | 4/2016 | Papsdorf | B65G 29/00 |
| 9,415,951 | B2 * | 8/2016 | Fahldieck | B08B 9/426 |
| 9,604,791 | B2 * | 3/2017 | Fahldieck | B65G 47/847 |
| 2011/0114454 | A1 | 5/2011 | Balzarin et al. | |
| 2011/0272246 | A1 | 11/2011 | Papsdorf | |

FOREIGN PATENT DOCUMENTS

| | | |
|---|---|---|
| DE | 690 11 749 T2 | 2/1995 |
| DE | 34 16 654 | 11/1995 |
| DE | 694 05 650 T2 | 2/1998 |
| DE | 100 50 084 A1 | 8/2001 |
| DE | 103 52 885 | 7/2005 |
| EP | 0 355 971 | 2/1990 |
| EP | 0 401 698 | 12/1990 |
| EP | 0 412 059 | 2/1991 |
| EP | 0 629 569 | 12/1994 |
| EP | 1 529 745 | 5/2005 |
| EP | 2 447 194 | 5/2012 |
| GB | 2 452 996 | 3/2009 |
| JP | S61 211220 | 9/1986 |
| JP | H06271056 | 9/1994 |
| JP | H07237745 | 9/1995 |
| JP | H10 338342 | 12/1998 |

* cited by examiner

ADJUSTABLE CONTAINER HANDLING DEVICE FOR HANDLING CONTAINERS, SUCH AS BEVERAGE BOTTLES

CONTINUING APPLICATION DATA

This application is a Continuation-In-Part application of International Patent Application No. PCT/EP2014/076060, filed on Dec. 1, 2014, which claims priority from Federal Republic of Germany Patent Application No. 10 2013 113 292.8, filed on Dec. 2, 2013. International Patent Application No. PCT/EP2014/076060 was pending as of the filing date of this application. The United States was an elected state in International Patent Application No. PCT/EP2014/076060.

BACKGROUND

1. Technical Field

The present application relates to an adjustable container handling device for handling containers, such as beverage bottles.

2. Background Information

Background information is for informational purposes only and does not necessarily admit that subsequently mentioned information and publications are prior art.

The present application relates to an adjustable container handling device for handling containers, such as beverage bottles. The container handling device comprises a transport star wheel having adjustable star wheel pockets. The star wheel has a turntable having format parts, which are disposed one above the other and have on their respective external circumference a plurality of star wheel pockets for receiving a respective container, wherein at least one of the format parts is rotatable in the circumferential direction relative to at least one other format part, such that an amount of opening of the star wheel pockets can be adjusted. In other words, the width and/or depth of the pockets can be adjusted as desired to permit handling of containers, such as bottles, of different sizes and/or dimensions.

Such devices are used, for example, in container treatment systems. Such container treatment systems are known in different configurations, such as filling machines, labeling machines, inspection machines, or rinsers. The containers are conveyed to the treatment machine standing upright on a conveyor belt, and possibly also aligned, wherein the container inlet and outlet takes place in each case by means of a star wheel. The inlet star wheel transports the containers onto the turntable. The containers are treated along the rotary transport path of the turntable, i.e. for example labeled, inspected, and/or the like, wherein the outlet star wheel received the treated containers. In this situation it is usual for each container diameter to be provided with its own set of star wheels, that is, the star wheels were customized or designed to only handle containers having one diameter.

The containers referred to herein can be used, for example, as bottles for liquids, such as beverages. Barrels or cans may also be such containers. The containers, such as bottles, can comprise a transparent or translucent material, such as, for example, glass or a translucent plastic, e.g. PET (polyethylene terephthalate). It is also conceivable, however, for the containers to comprise other materials and to be filled with other filling products. Containers in the meaning of the present application can also be preforms, i.e., objects which are still to be formed into containers, such as plastic preforms or blanks to be blow molded into plastic containers.

It can be seen that, in the event of a change of container, the appropriate adjusted star wheel set must be or should be or could be fitted, wherein the conversion procedures naturally incur substantial downtimes. Accordingly, efforts are known to provide for adjustable star wheels, wherein their format parts can be adjusted to different container dimensions, for example to different container diameters. This allows for time-consuming conversion work to be avoided and/or minimized and/or reduced. In other words, if there is a switch from handling containers of larger diameter to containers of a smaller diameter, the size of the star wheel pockets can be quickly adjusted, without having to shut the machine down and replace one set of pocket structures with another set of pocket structures.

Accordingly, some devices comprise two coaxial star wheels connected to one another, wherein a middle coaxial star wheel is arranged between the two star wheels. Means may be provided to rotate the middle star wheel in relation to the pair of star wheels by an adjustment angle in such a way that the device can be adjusted to different container diameters.

Some thrusting and/or centering flanks of the star wheel may be independently driveable and adjustable in their rotation position to the different container diameters, by rotational movement relative to the container mid-point, adjustable to the respective container jacket diameter and to the corresponding position in the machine.

A star wheel with an adjustment device is known. In this situation, the openings of the container receptacles are changed, in that toothed bars are rotated by the effect of toothed wheels, such that two star wheels arranged above one another are rotated opposite one another about their common axis of rotation.

Some devices comprise retaining devices that are arranged on the turntable, and can be moved relative to it, wherein each retaining device comprises a suction device. The suction device is carried on a slide element, which can be moved in a radial direction relative to the turntable.

Some devices comprise an inlet and outlet star wheel, which comprises adjustment devices at its carrier wheel, which comprise cut-out apertures with different radii.

Some devices comprise receiving pockets being adjusted to the largest possible container diameter, into which elastic resetting means are accommodated which can be adjusted to a smaller container diameter.

Some devices comprise an adjustable receiving opening. Some devices comprise transfer star wheels, which are provided with a plurality of rams, which adjust to different containers, and are also provided with an external regulatable guide element.

Some devices comprise adjustable star wheel pockets. For this purpose, an adjustment mechanism is provided, which comprises a first and a second adjustment element. The first adjustment element is coupled to a first transport wheel. The second adjustment element is coupled to an adjustment body. The movements of both adjustment elements are coupled to one another, wherein the first and the second adjustment elements are in each case coupled about a predetermined pivot axis.

Some devices comprise adjustment means for adjusting a middle star wheel arranged between two star wheels. The adjustment means is a threaded spindle mounted in two threaded guides.

Some devices comprise adjustable star wheel pockets.

OBJECT OR OBJECTS

The adjustability of turntables to different container diameters therefore allows for room for improvements. The present application is therefore based on the object of providing a device of the type referred to herein, which allows for simple adjustment to different container diameters.

SUMMARY

According to the present application, the object is resolved by a container treatment system according to the present application.

Reference is made to the fact that the features and measures included in the following description can be combined with one another in any technically feasible manner, and disclose further exemplifications of the present application. The description further characterizes and specifies the present application in connection with the figures.

Proposed is a device for the transporting of containers, such as bottles and cans. The device is in the form of a transport star, which comprises a turntable or standing surface, with format parts disposed one above the other. These star-shaped format parts form together, at the external circumference, a plurality of star wheel pockets or transport pockets, which serve to receive one container in each case. In this situation, for the adjustment to different container diameters, at least one of the star-shaped format parts can be rotated relative to one or more other fixed format parts (in the circumferential direction), such that the pocket diameter or the opening amount of the star wheel pockets formed in common is changeable.

It is to this purpose if in each case two mutually opposed format parts in each case comprise at least one control element, wherein the control elements of format parts disposed directly above one another exhibit a different orientation, wherein an adjustment element is provided which engages both into the control element of the one format part and into the control element, disposed below or above, of the other format part. In this situation, the different orientation can comprise the fact that, relative to the radial direction, the control element of a format part exhibits a different curve course (radius) or a different deflection angle to the radius than one or more control elements of the other format parts. It should be noted that most occurrences of the term "radius" herein refer to a radius extending perpendicular to the machine axis or center axis or rotational axis of the star wheel.

In at least one possible exemplification, orientations of two individual control elements or groups of control elements are mirror-image to one another, wherein the radius forms the mirror axis. In at least one possible exemplification, in this situation the control elements of different format parts are arranged in relation to one another in the form of longitudinal holes or guide curves in parallel or substantially parallel planes disposed above one another.

In a simplified variant, in one possible exemplification, if small adjustment values/angles are required and/or desired for the star pockets, one control element or group of control elements needs to be or should be oriented differently relative to the radius, while the other control element or group of other control elements are in this situation oriented radially to the adjacent format parts.

The format parts can also be designated as star wheels. It is conceivable for four star wheels to be provided for, of which, in each case, two upper wheels and two lower wheels are adjustable relative to one another, which will be considered in more detail hereinafter.

In one possible exemplification of the present application, provision can be made for the respective control element to be configured as a link. The link can, in this situation, purposefully be located in an extension, which is arranged at an inner circumference of the respective format part.

In one possible exemplification, the extension exhibits a triangular configuration, the base of which is disposed at the inner circumference of the format part, wherein the extension in one possible exemplification exhibits a rounded tip, which extends from the inner circumference on a path orientation. The respective extension can be in a position which is congruent to the other extension in each case, which is arranged above or below it.

The respective link is now introduced into the extension as a longitudinal hole, wherein, in one possible exemplification, provision is made for control elements assigned to one another to be oriented in the radial direction to a middle axis of the turntable, but of different alignment. This means that a control element can, for example, exhibit a curved course which is different to the curved course of the other assigned control element. The control elements assigned to one another can, in one possible exemplification, intersect one another, wherein the control elements assigned to one another are arranged with their resultant middle axes of the curved longitudinal holes at an angle to one another. The longitudinal holes can also be configured without curvature, and simply arranged at an angle to one another. With a curved course of the control elements assigned to one another, the situation is that these are oriented outwards relative to a middle line of the turntable, i.e. they are convex in each case. It is also possible for one of the control elements to be configured without curvature, i.e. in a straight line at a fixed deflection angle to the radius, wherein the other assigned control element can be configured with a curved course.

Due to the rotational container transport about the axis of rotation of the turntable, corresponding forces take effect at the circumference of the format parts. Since the control elements are arranged at an angle to one another, the resulting force in the radial direction is reduced. In this situation, in one possible exemplification, a self-retention can be achieved, if the angles are chosen accordingly.

The control elements assigned to one another are connected for the purpose of effect by way of the respective adjustment element. It is appropriate in the meaning of the present application if the adjustment element comprises a bolt, on which sliding blocks are arranged. One of the sliding blocks engages into the one control element, while the other sliding block engages into the other control element.

The exemplifications shown and described comprise the fact that, apart from the one or more actuating elements, for example in the form of a spindle or a spindle rod, no further radial guide bolts, guide rods, etc. Rather, the actuating element itself serves as the drive element and as the sole radial guide element. In one possible exemplification, the spindle-shaped actuating elements comprise, at least at one of their ends, an outer thread, which can be brought into engagement with corresponding female threads of the adjustment element.

The section which, in the installed position, is located lying radially inwards or centrally can, in a suitable manner, be formed differently for this purpose, depending on the type of torque transfer desired onto the respective spindle or spindle rod, such as, for example, by way of a hand wheel, a motor coupling, a tool engagement contour, etc. If another type of linear drive is provided for, such as a thrust rod, which is electromagnetically driven, the force induction must be or should be adapted accordingly, in order to allow for the radial drive of the adjustment element.

In one possible exemplification, the adjustment element comprises a tensioning device, which is arranged on the head side at the bolt. The tensioning device can be, for example, a screw or an eccentric clamping device. If the tensioning device is in the tensioned position, the slide blocks are pressed vertically, such that the star wheels, i.e. the star wheel planes concerned, are fixed relative to one another by frictional resistance. The middle position, i.e. the middle of the star wheel pocket adjusted, is secured by a guide element, wherein the axes of the slide blocks are guided radially. Due to the self-retention described above, which can in one possible exemplification be achieved, the clamping force of the tensioning device will be sufficient, since no more direct retention force is to be applied, which is in fact already the case if the self-retention has not yet been attained. Accordingly, even with high circumferential forces, a location-stable star wheel pocket size can be achieved. If the tensioning device is released, the star wheels can be rotated to one another. This can be done manually, in that, for example, the star wheels are acted on, such that they are rotated by force by the link guide.

In one possible exemplification, the adjustment element comprises an actuation element with an outer thread, which interacts with a threaded hole of the adjustment element. A threaded hole is introduced into the bolt, wherein the bolt comprises the slide blocks, which engage into the control elements assigned to one another. It is purposeful if the actuation element is mounted on a rigid retention element. To this extent, a spindle drive is essentially formed.

By rotating the actuation element, the bolt is directly thrust in the radial direction, such that the slide blocks are moved along the forced guide path, i.e. along the control elements. This causes the star wheel planes assigned to one another, i.e. the star wheels, to rotate relative to each other, in order to adjust and set the desired pocket size. Due to the position of the bolt between the star wheel planes, they also take over the task of securing rotation, in the sense of a torque brace.

In addition to the thrusting of the bolt, the actuation element also has the function of securing the position of the star wheel pocket size which has been set, such that it is possible to do without a separate guide element for securing the middle location. At the actuation end of the actuation element, a hand wheel can be arranged, such that the actuation element can be rotated manually. It is also possible for a crank to be provided at the actuation end, and/or for a drive to be brought into engagement, which carries out the desired adjustment automatically. It is also conceivable in principle for an automated adjustment to be provided for, wherein the adjustment takes place by means of control units with computer support. It is feasible for the actuation element not to be provided with an outer thread entirely along its axial extension. It is sufficient if the outer thread is arranged at the free end region, which can be provided for the adjustment movement.

In a possible variant, provision can be made for two actuation elements to be arranged at the single rigid retention element, of which in each case one takes effect on an adjustment element allocated to it. The two actuation elements are, in one possible exemplification, oriented opposite one another, and in an appropriate manner take effect in each case on different star wheel planes. In this situation, one of the actuation elements can comprise a left-hand thread, and the other a right-hand thread, wherein the inner threads of the bolts are configured accordingly.

It is possible for two star wheels to be present, wherein one of them is fixed mounted, and the other is adjustably mounted, such that the adjustment can take place. It is also possible for both star wheels to be adjustably mounted, wherein a locking arrangement in the operational state is possible. It is also possible for three star wheels to be provided for, of which one middle one, or the two outer ones, or three, are rotatably adjustable. It is also conceivable for four star wheels to be provided for, wherein, in each case, two star wheels disposed above one another form an upper plane or portion, and wherein the two others form a lower plane or portion. Accordingly, the star wheels, with their star wheel pockets, can be adjusted to different container diameters, for example in the belly or body region of the container. It is possible in this situation for four star wheels to be adjustably mounted, wherein, however, it can also be sufficient in each case for one of the star wheels of the upper and lower plane to be fixed mounted, with the other star wheel being adjustable relative to them.

As an alternative to the formation of star wheel pockets by means of star wheels, it is also possible, for example, for star wheel pockets to be formed by clamp arms, which are arranged such as to correspond to one another. Accordingly, of two clamp arms which form a star wheel pocket, a first clamp arm can be arranged at a first format part, and a second clamp arm at a second format part. The format parts are disposed above one another and rotatable against one another, such that, even with the formation of clamp arms instead of star wheels, the distance interval between the clamp arms (the star wheel pocket size) can be adjusted by means of the rotational movement of the format parts.

As has already been described, the transport star wheel can comprise a plurality of planes. As an alternative to an upper plane formed from star wheels or clamp arms, the upper plane comprises, in one possible exemplification, container clamps, arranged next to one another, for gripping and holding the containers.

The expression "container clamp" is understood to mean a device which is formed such as to clamp around the container. The container clamp comprises, in one possible exemplification, two clamp arms, which are formed such as to correspond to each other, and between which a section of the container can be clamped. The clamp arms are, in one possible exemplification, moved by means of an adjustment device. In this situation, the container clamp can be configured as a passive clamp, which is held by spring tension in a clamping position, and with which, in order to open the clamps, the container must be or should be pressed between the clamp arms. The container clamp can also be an active clamp, with which, for example, by means of a control curve, the adjustment device is activated, such that the clamp arms are closed, opened, and/or both closed and opened, by means of the adjustment device.

In one possible exemplification, in each case, a container clamp in the upper plane of the transport star wheel is assigned to each star wheel pocket in the lower plane of the transport star wheel. A container which is taken up by the transport star wheel is therefore held in the region of the lower plane in a star wheel pocket (in one possible exemplification transverse to the radial direction), which is formed by two star wheels or by two clamp arms. In order for the container not to deviate radially out of the transport star wheel when the star wheel is in operation, due to the centrifugal forces created, a counter-stop is usually provided. Due to the configuration of the transport star wheel with an upper plane of container clamps, however, the transport star wheel can be used without a counter-stop, since the container clamps prevent and/or restrict and/or minimize a radial movement of the container held in the transport star wheel.

For this purpose, the container clamps are configured in such a way that they grip around the container at least in sections, and therefore prevent and/or restrict and/or minimize at least a movement radially outwards. In one possible exemplification, however, the container clamps additionally comprise a further contact surface, on which the container is supported, and by means of which a movement radially inwards, i.e. towards the transport star wheel, is blocked.

The transport star wheel is in one possible exemplification suitable for transporting bottles, such as glass or PET bottles. Bottles in most cases exhibit a tapering shape in the direction of the mouth region. In order to be able also to receive bottles of different sizes and diameters on the transport star wheel, and, in one possible exemplification, for them to be received by means of the container clamps, the container clamps in one possible exemplification comprise two clamp arms, with in each case a clamp jaw which is rotatable about an axis of rotation aligned in the longitudinal axis direction of the clamp arms.

The longitudinal axis direction of the clamp arms extends, starting from one outer end of the clamp arm in the direction of the center of the transport star wheel. Depending on the orientation of the clamp arms, the longitudinal axis direction of the clamp arms can therefore correspond, for example, to the radial direction of the transport star wheel. The clamp jaw can therefore pivot about a head end of the clamp arm, i.e. it can be set obliquely opposite a vertical longitudinal axis of the transport star wheel. As a result of this, a secure or substantially secure retention of the clamp jaw on the container can be achieved, in one possible exemplification at a conically shaped region of the container, such as a bottle neck.

In order to improve still further the stability of the clamp jaw in relation to as many drink containers as possible, in one possible exemplification drink or beverage bottles, which differ in their dimensions, a further exemplification of the present application also makes provision for every clamp jaw to comprise at least one gripping limb to engage around the container, and a support limb to support the container.

The clamp jaw can therefore be configured with a U-shaped profile, i.e. half-shell, and with two limbs. The limbs are in one possible exemplification of different lengths, wherein, in one possible exemplification, the support limb is shortened in relation to the gripping limb.

The limbs extend outwards, wherein the gripping limb is configured and arranged in such a way that it engages with one section, such as a gripping section, around the bottle, and therefore blocks a movement of the container radially outwards. Conversely, the support limb is configured such as to support the container, wherein a movement of the container in the direction radially inwards, i.e. towards the middle of the transport star wheel, is prevented and/or restricted and/or minimized. As already indicated, for this purpose the support limb is, in one possible exemplification, configured as shorter than the gripping limb. In one possible exemplification, both limbs comprise in each case at least one contact surface, which is provided for the purpose of contact with the container. Accordingly, the contact surfaces of the support surfaces are, in one possible exemplification, arranged pointing outwards towards a mid-axis of the container clamp, as a result of which the contact of the container at the contact surfaces is perceptibly improved.

The gripping limbs additionally comprise at least one arc-shaped contact surface, which is in contact at the drinks container at least with one end section located on the outside.

The clamp jaw with the U-shaped profile is, in one possible exemplification, arranged at the clamp arm in such a way that the gripping limb, configured as longer in relation to the support limb, is positioned beneath the support limb, in the direction of the vertical longitudinal axis of the transport star wheel. After a container has been taken out of the container clamp, this arrangement makes it essentially easy for an automatic back-pivot movement to be carried out about the rotation axis of the clamp jaw, into a perpendicular or substantially perpendicular starting position.

In one possible exemplification, the exemplification of the transport star wheel with a lower plane, which comprises star wheel pockets and is formed from star wheels or clamp arms, and an upper plane of container clamps, provides, with a plurality of different containers, a good operational capacity with good functionality and ease of use. As well as this, a transport star wheel in this configuration is in one possible exemplification robust and insensitive to glass shards or other sources of contamination. With the clamp jaws pivoting about the axes of rotation, there is also a good or substantially good utilization of the division between the bottles, since the clamp arm is provided with sufficient space to open in the neck region of the drinks bottle. Accordingly, the special positioning of the container clamps in combination with the star wheel pocket located in the lower plane in the machine allows for an essentially simple structural design arrangement of, for example, glass shard protection devices which may be necessary and/or desired. A further possibility is that, for example with the use of an active container clamp, there is no need and/or desire for a guide-out curve in the upper region of the container, to conduct the container out of the system.

It is to be noted that the upper plane with the container clamps can be combined with any type of lower planes as referred to previously. The deciding factor is the support of the container in the lower plane transverse to the radial direction and the fixed surround clamping of the container in the region of the upper plane by means of the container clamp, in order, during operation, for a radial movement of the container at least outwards to be reliably prevented and/or restricted and/or minimized.

The above-discussed exemplifications of the present invention will be described further herein below. When the word "invention" or "exemplification of the invention" is used in this specification, the word "invention" or "exemplification of the invention" includes "inventions" or "exemplifications of the invention", that is the plural of "invention" or "exemplification of the invention". By stating "invention" or "exemplification of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The present application is explained in greater detail hereinafter on the basis of the figures, showing a possible exemplification. The figures show.

DESCRIPTION OF EXEMPLIFICATION OR EXEMPLIFICATIONS

In the different figures, the same parts are provided with the same reference numbers, as a result of which these are described once.

Figure 1:
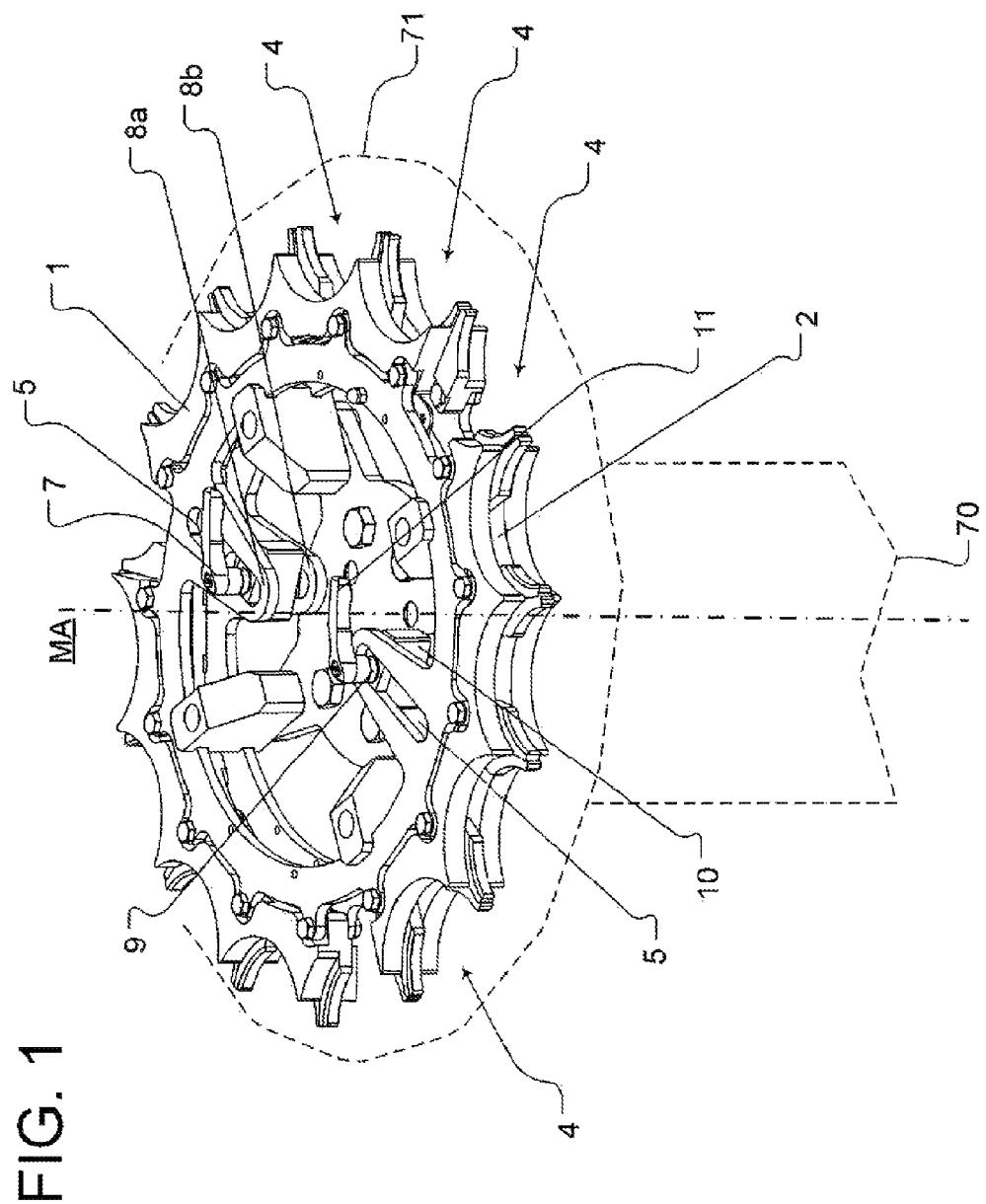
FIG. 1 shows section of a star transporter with the possibility of adjustment, in a first exemplification.
Figure 3:
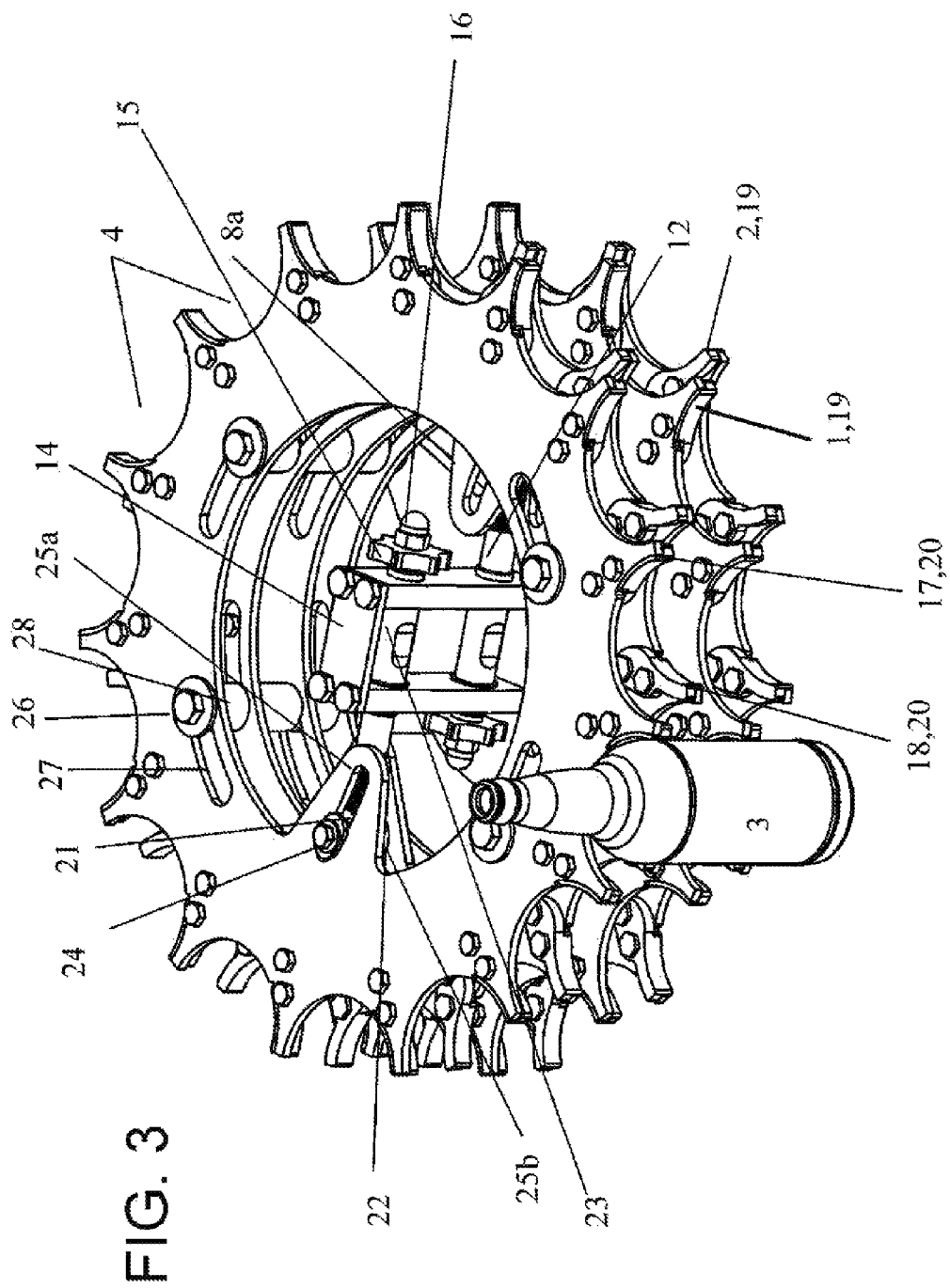
FIG. 3 shows a perspective view onto a star transporter.

FIG. 1 shows format parts 1 and 2. The format parts 1 and 2 are constituent parts of a device for transporting containers 3 (FIG. 3). The format parts 1 and 2 form a turntable of the device, and are disposed one above the other. The format parts 1 and 2 have, on their respective external circumferences, a plurality of pocket-like cut-out openings. The openings of each of the format parts 1 and 2 jointly define or form star wheel pockets 4 for receiving a respective container 3. At least one of the format parts 1 or 2 can be rotated in the circumferential direction relative to the other format part 1 or 2, such that an amount of opening of the star wheel pockets 4 can be adjusted. In the exemplification shown in FIGS. 3 and 4, there are fifteen star wheel pockets 4. As shown in FIG. 1, a central column 70 of the transport star wheel and a carrier surface 71 for the containers 3 are represented by broken lines. It should be understood that although the central column 70 and carrier surface 71 are only represented in FIG. 1, they may be utilized in any exemplification disclosed herein. The carrier surface 71 can be configured as a plate or as a plurality of part-plates or plate-like carriers. The central machine axis MA, about which the star wheel pockets 4 circulate, is represented as a broken line, and is likewise to be regarded as applying to any exemplification disclosed herein. Other associated handling or transport devices that are common to bottle or container handling machines and systems are not represented here or hereinafter.

The format parts 1 and 2 can also be designated as star wheels 1 and 2, which in each case comprise a control element 5, 6. The respective control element 5, 6 of the format parts 1, 2, arranged directly above one another, exhibit a different orientation to the one to which they are assigned in each case. An adjustment element 7 is provided, which engages both into the control element 5 of the first format part 1 and into the control element 6 of the other format part 2.

Figure 4:
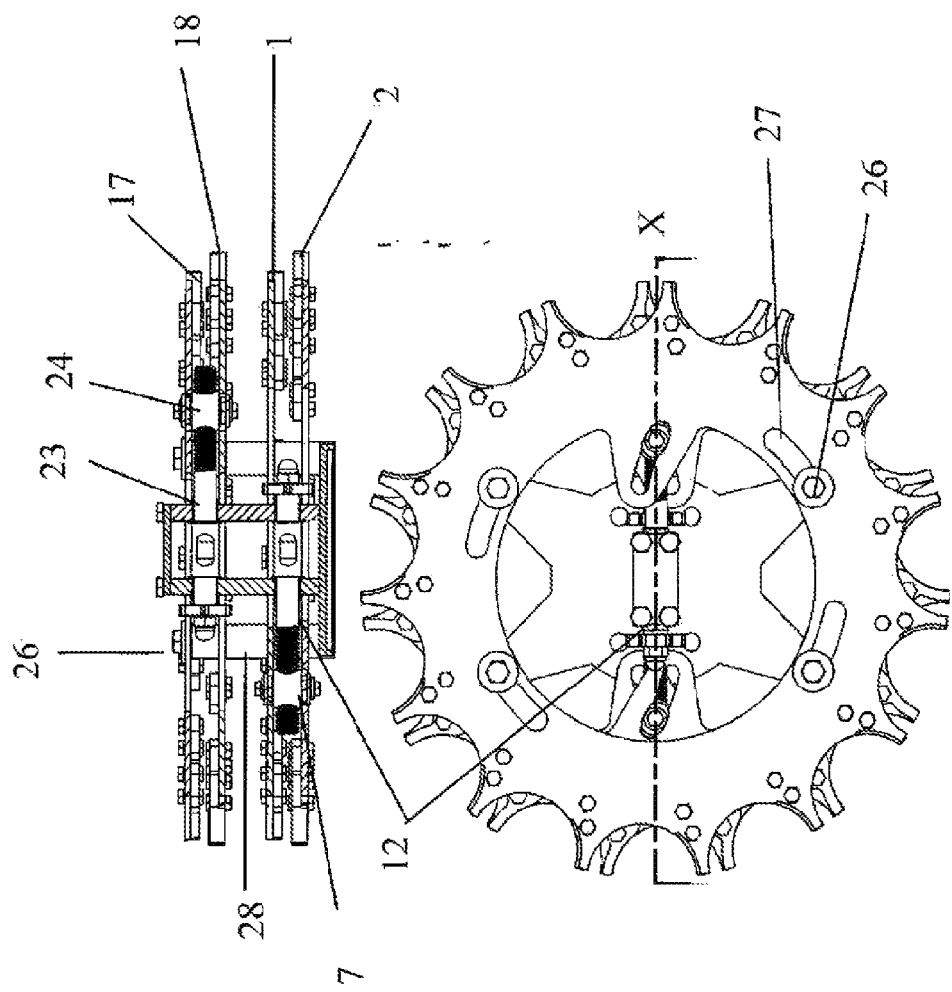
FIG. 4 shows a side view and a view from above onto the star transporter from FIG. 3.

The respective control element 5, 6 is configured as a link guide, i.e. for example as a longitudinal hole running at an angle or obliquely relative to the radius, which in each case is located in an extension 8a, 8b. The extension 8a is arranged at the format part 1, while the extension 8b is arranged at the format part 2. The respective extension 8a, 8b is arranged with its base on the inner circumference of the respective format part 1 or 2, and, in one possible exemplification, extends with a rounded tip oriented away from the inner circumference into the interior format part 1 and 2 concerned. The two assigned control elements 5, 6 intersect, wherein both control elements 5, 6 point outwards related to a middle axis X (FIG. 4). As an alternative, these control elements 5, 6 could be running curved, i.e. cambered in a curved manner.

The adjustment element 7 comprises a bolt 9, arranged on which are slide blocks 10. One of the slide blocks 10 engages into the one control element 5, while the other slide block 10 engages into the other control element 6.

The adjustment element 7 comprises a tensioning device 11, which is arranged on the head side at the bolt 9. The tensioning device 11 can be configured as an eccentric clamping device, as can be seen in the example.

In the position represented in FIG. 1, the tensioning device 11 is tensioned. In this situation, the slide blocks 10 are pressed vertically, such that the star wheels 1, 2 are fixed relative to one another by frictional resistance. By means of an additional guide element, not represented, the middle position is secured, i.e. the middle of the adjusted star wheel pocket 4, while the axes of the slide blocks 10 are guided radially. If the clamping device 11 is released, the star wheels 1, 2 can be rotated towards one another, such that star wheel pockets 4 can be adjusted to the desired reception size.

Figure 2A:
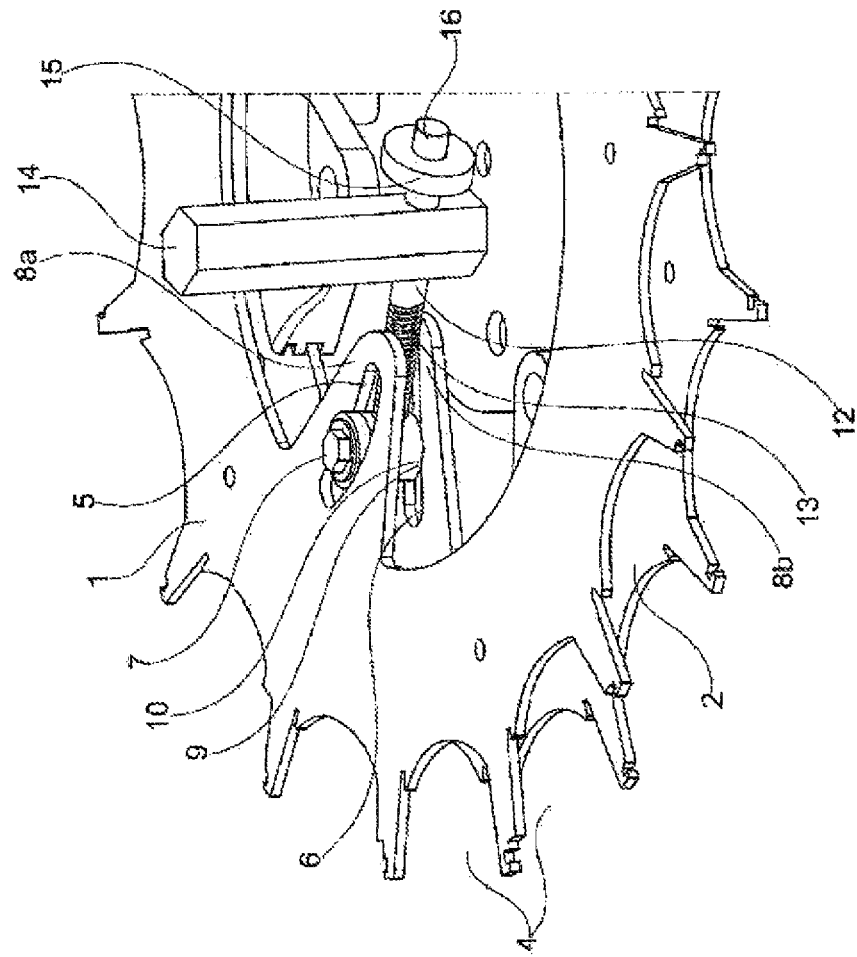
FIG. 2A shows a section of a star transporter with the possibility of adjustment, in a second exemplification.

With the exemplification represented in FIG. 2A, a spindle drive is represented for the adjustment of the star wheel pockets 4. In this situation, the bolt 9, which carries the slide blocks 10, comprises an inner thread, into which an actuation element 12 engages with an outer thread 13. The actuation element 12 is mounted on a rigid retention element 14, and comprises on the head side, i.e. opposite to the outer thread 13, an actuation end 15, arranged at which is, for example, a hand wheel 16. The rigid retention element 14 is, as can be seen by way of example, a simple column, which, purely by way of example, is configured as hexagonal. The actuation element 12 is accommodated in a passage hole in the rigid retaining element 14 such as to rotate. Not shown is the fact that the actuation element 12 can comprise the outer thread 13 along its axial extension as far as the actuation end 15, i.e. as far as the hand wheel 16, such that an undesired movement in the radial direction can be avoided and/or minimized and/or restricted, if a corresponding inner thread is arranged in the rigid retention element 14.

By rotating the actuation element 12, i.e. by rotating the hand wheel 16, the bolt 9 is pushed directly in the radial direction, such that the slide blocks 10 are moved along the forced guide path, i.e. along the control elements 5, 6. The star wheels 1, 2 assigned to each other are therefore rotated relative to each other in order to adjust the desired pocket size 4.

Figure 2B:
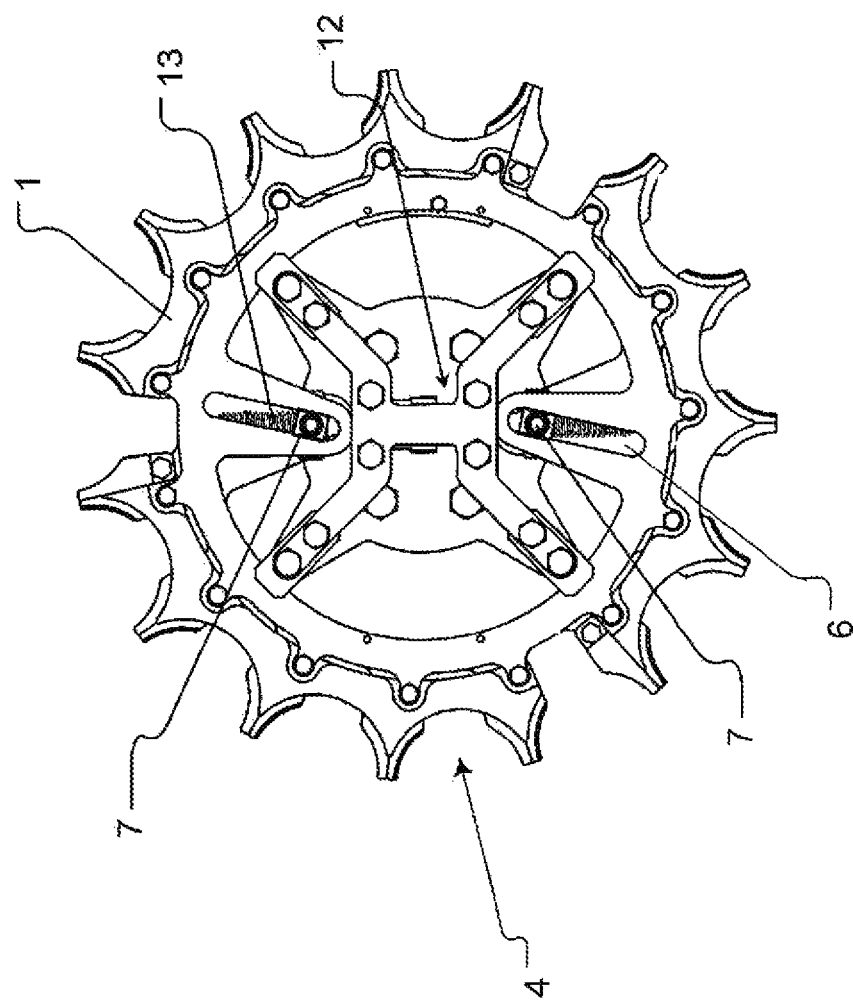
FIG. 2B shows a section of a star transporter with the possibility of adjustment, analogous to FIG. 2A or 3, with a single central adjustment drive.

FIG. 2B shows in a view from above variants of FIGS. 2A or 3. In this situation, one single spindle is provided as the actuation element 12 with two outer threads 13 at the two ends. It can be seen that no further guide element is required and/or restricted and/or minimized. The spindle-shaped actuation element 12 serves as a drive element and as the sole guide element for the radial movement of the adjustment elements 7.

With the exemplification represented in FIGS. 3 and 4, four format parts 1, 2 and 17, 18 can be seen, wherein the format parts 1, 2 form a lower plane 19, and the format parts 17, 18 form an upper plane 20.

The format parts 1, 2 and 17, 18 comprise in each case control elements 5, 6 and 21, 22, which lie diametrically opposite one another and are naturally offset in height, which is attributable to the height interval spacing between the lower plane 19 and the upper plane 20. The control elements 21, 22 are arranged in the extensions 25*a* and 25*b*. It can be seen that two actuation elements 12 and 23 are provided, which are oriented offset relative to the respective other element. Accordingly, the one actuation element 12 takes effect on the adjustment element 7, while the actuation element 23 takes effect on the adjustment element 24. The rigid retention element 14 is configured in the form of a portal, wherein the portal columns likewise support the actuation elements 12 and 23 likewise with the heights offset. In the situation with one single continuous spindle as the actuation element, comparable with FIG. 2B, one end exhibits a right-hand thread, while the other then has a left-hand thread. The inner threads of the bolt 9 are naturally configured accordingly in this case.

The format parts 1, 2, 17 and 18 can be blocked by means of these continuous blocking elements 26, such that the transport star pocket 4 which has been adjusted can additionally be secured in its position. The blocking elements 26 engage in each case through curved longitudinal holes 27 introduced into the format parts 1, 2, 17 and 18, wherein spacer elements 28 are arranged between the format parts concerned, 1 and 2, 1 and 18, and 18 and 17, as can best be seen from FIGS. 3 and 4. Accordingly, the blocking elements 26 can release the format parts 1, 2, 17 and 18 for the adjustment and setting of the desired pocket size, and then secure them again by being tightened. If two format parts 1 and 17 can be adjusted, while the format parts 2 and 18 are fixed, then the same principle applies, with the corresponding restriction. The blocking element 26, with the corresponding spacer elements 28 and with the longitudinal hole 27 can naturally also be provided for the exemplifications according to FIGS. 1 and 2. As has already been described previously by analogy, the two spindles serve as actuation elements 12 and 23, each with an outer thread 13 at the ends located radially outwards, such that no further guide elements are required and/or desired. The spindle-shaped actuation elements 12 and 23 serve in this situation as drive elements and as the radial guide elements.

In FIG. 3 it is shown that a single actuation element 12 is provided, with an outer thread 13 in the form of a spindle on the one side for the lower plane or the lower format part 2 respectively, and, moreover, the one further actuation element 23, with an outer thread 13, takes effect in the form of a spindle on the other side. As described previously, however, this is in no way to be regarded as restrictive, since, without departing from the basic concept, both spindles can be mounted on the same face side, or a single continuous spindle can be provided, with two outer threads 13 or thread ends per plane or, respectively, per format part 1 or 2.

Figure 5:
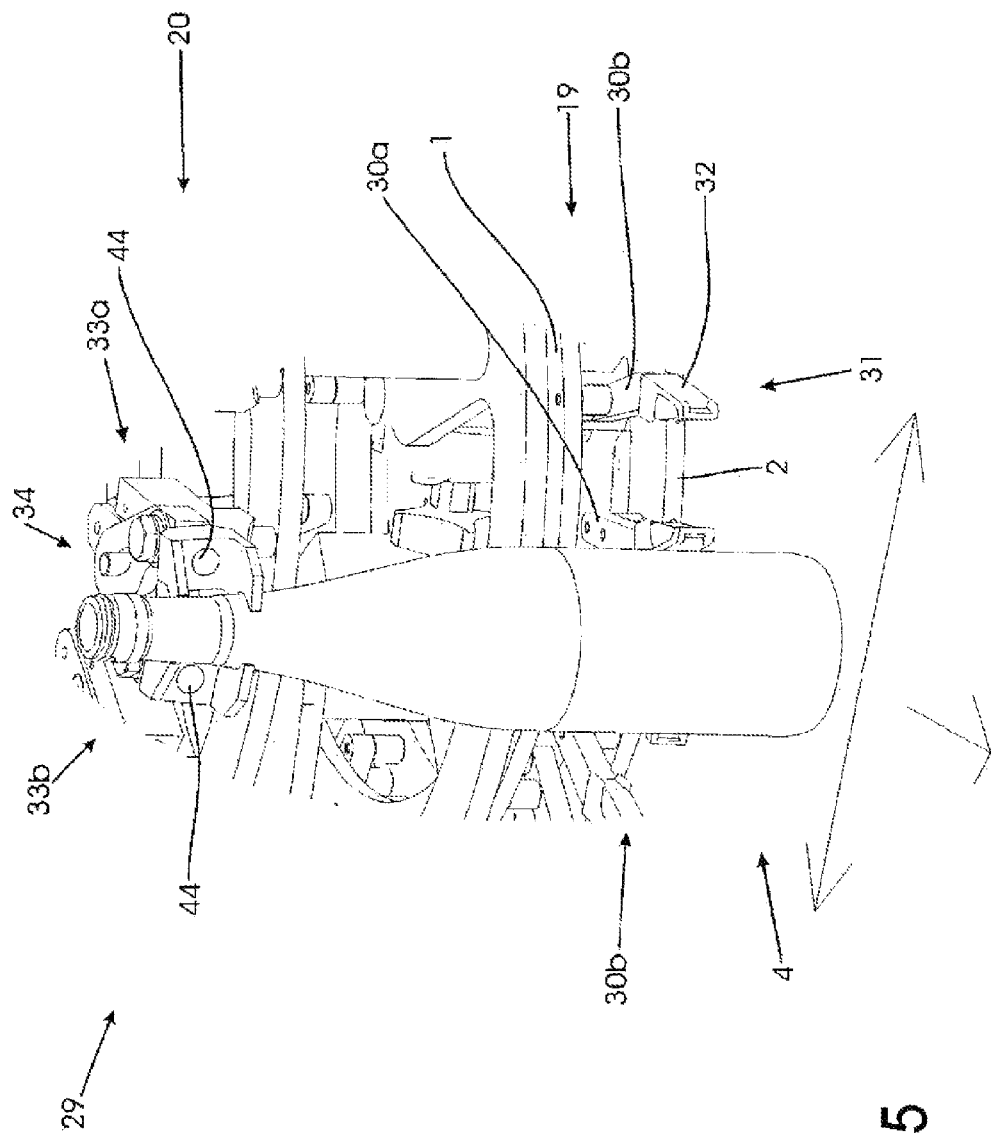
FIG. 5 shows schematically, in a perspective representation, a section of a further exemplification of a star transporter.

FIG. 5 shows schematically, in a perspective representation, a further exemplification of a transport star wheel 29.

The transport star wheel 29 comprises two format part planes, a lower plane 19 and an upper plane 20, with a container 3 held by both planes, in this case a bottle for beverages, drinks, or similar liquids.

The lower plane 19 comprises two format parts 1, 2 disposed above one another, which are mounted such as to rotate against each other, or to rotate in opposite directions, such as one clockwise and the other counterclockwise. Arranged in the two format parts 1, 2 are clamp arms 30*a*, 30*b* for the formation of the transport star pockets 4. Of the two clamp arms 30*a*, 30*b*, which form a transport star pocket 4, in each case one first clamp arm 30*a* is arranged at the lower format part 1, and a second clamp arm 30*b* is arranged at the upper format part 2. Secured to a free end 31 of the clamp arms 30*a*, 30*b* in each case is an exchangeable protective cap 32.

The lower plane 19 represents a further alternative exemplification to the exemplifications of a transport star wheel represented in FIG. 1 to FIG. 4. It can be used accordingly also with transport star wheels 29 with one plane as a stand-alone transport star wheel 29.

Figure 6:
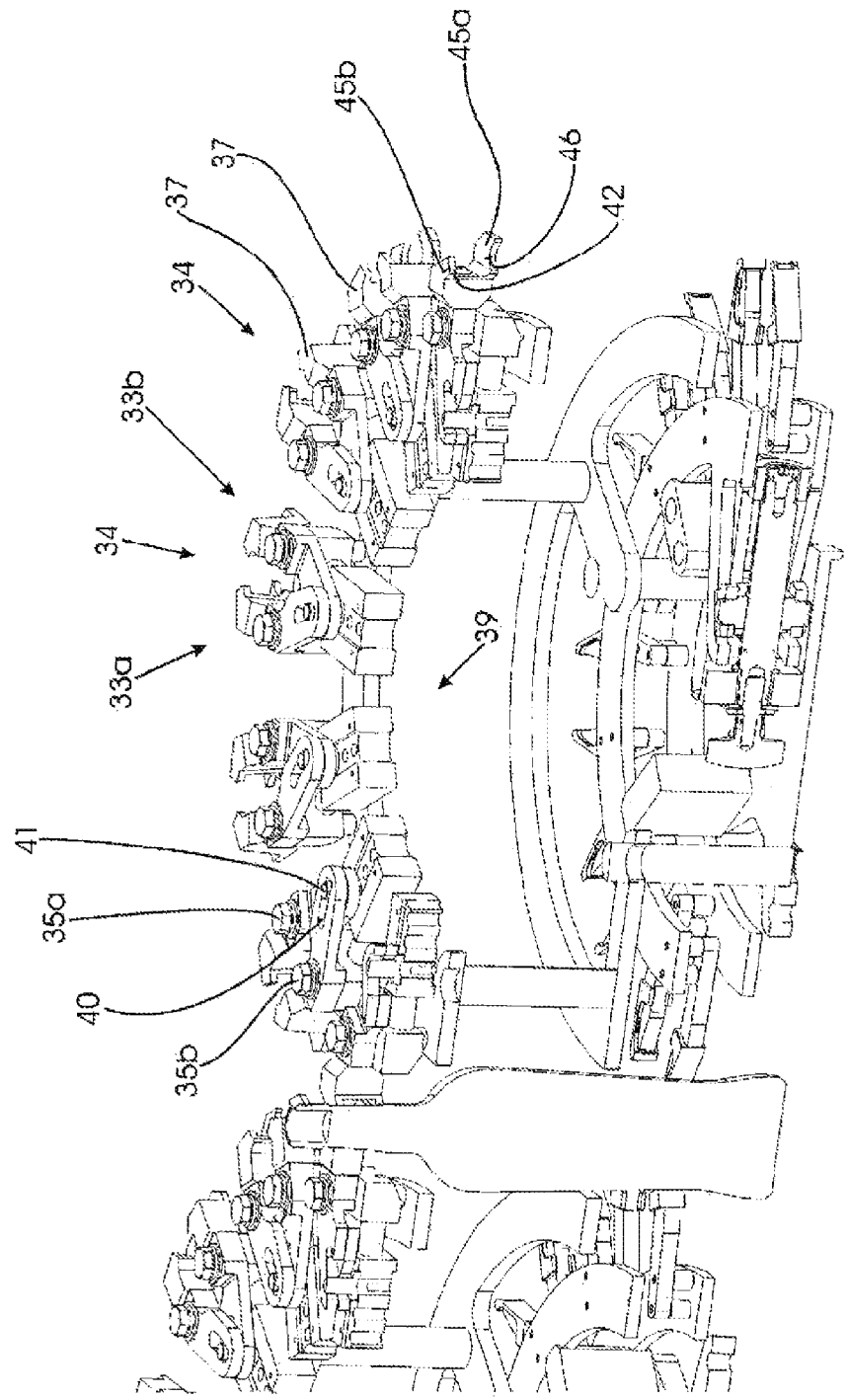
FIG. 6 shows schematically, in a perspective representation, a section through the star transporter from FIG. 5, at the time of a container transfer.

The upper plane 20 of the transport star wheel 29 represented in FIG. 5 and FIG. 6, by contrast with the transport star wheel represented in FIG. 3 and FIG. 4, comprises a clamp arm plane. That is to say, the transport star wheel 29 comprises the lower plane 19 with adjustable star wheels or clamp arms 30*a*, 30*b*, and the upper plane 20 with clamp arms 33*a*, 33*b*. In this situation, in each case two clamp arms 33*a*, 33*b*, formed and arranged so as to correspond to each other, form one container clamp 34. Assigned to each transport star wheel pocket 4 is a container clamp 34 in the upper plane 20.

The container clamp 34 can be configured as a passive clamp, with which, by means of a spring tension, the clamp arms 33*a*, 33*b* are held in a clamp position, such that the clamp pressure taking effect on a container 3 is produced by means of the spring tension, and the opening of the container clamp 34 is effected by the pressing of the container in between the clamp arms 33*a*, 33*b*. Conversely, however, in this case the container clamp 34 is configured as an active container clamp 34, with which at least the opening or the closing of the clamp, or both movements if appropriate, is effected by a corresponding adjustment device 39, which is partially represented in FIG. 5 and FIG. 6.

The clamp arms 33*a*, 33*b* of a container clamp 34 are in each case mounted such as to pivot about a rotation axis or axle 35*a*, 35*b*. Each rotation axis or axle 35*a*, 35*b* is arranged at the respective clamp arm 33*a*, 33*b*, between a free end 36 with a clamp jaw 37 and a control arm 38, opposite the free end 36, which is coupled to the adjustment device 39.

The control arms 38 of a container clamp 34 run obliquely towards one another opposite an axis which runs in the radial direction. The control arms 38 are at least in some sections arranged above one another. Link guides 40, arranged in the control arms 38, are connected to one another by means of a link bolt 41, by means of which a synchronous movement of the clamp arms 33*a*, 33*b* is essentially guaranteed or promoted.

For the opening and/or closing of the clamp arms 33*a*, 33*b*, the adjustment device 39 can, for example, be actuated by means of a control curve (not represented here). The control curve could be a cam-type system in which a roller structure engages with the cam to cause the opening and/or closing of the clamp arms 33*a*, 33*b*.

The clamp jaws 37 are specially configured for gripping a bottle in the region of the bottle neck. The clamp jaws 37 are configured for this purpose as half-shell and comprise a shortened support limb 45*a* with a contact surface 42 for the contact with the container 3 and a gripping limb 45*a* configured as longer than the support limb 45*b*, with an arc-shaped contact surface 46.

The contact surface 42 of the support limb 45*b* is configured for the contact with the container 3, and arranged in such a way that a movement of a container 3 in contact at the contact surface 42 in a radial direction inwards is blocked, i.e. in the radial direction towards the middle of the transport star wheel.

By contrast, the gripping limb 45a, and, in this case, in one possible exemplification, the arc-shaped contact surface 46, are configured so as to grip (at least partially) behind the container 3, as a result of which a movement of the container 3 radially outwards is prevented and/or restricted and/or minimized, caused, for example, by the radial forces taking effect outwards when the transport star wheel 29 is in operation. A section of the gripping limb 45a is therefore arranged pointing outwards in the radial direction A.

The containers 3 held by the transport star wheel pockets 4 and the container clamps 34 exhibit, possibly when formed as bottles made of glass or PET for example, a conical form, i.e. tapering upwards to the mouth region. In order for the container clamp 34 to be able to engage possibly securely on the container 3, the clamp jaws 37 are mounted such as to rotate about a horizontal rotation axis 44 at the clamp arms 33a, 33b, wherein the rotation axis 44 is in one possible exemplification formed as a bolt or sump axis. With the example shown, the clamp jaws 37 are mounted at the clamp arms 33a, 33b, such as to rotate about a rotation axis 44 extending in the longitudinal axis direction of the clamp arms 33a, 33b. With an alternative exemplification of the rotation axis 44, not shown, this is configured as part of the clamp jaws 37, and in one possible exemplification as a monoblock, with the clamp arms 33a, 33b comprising corresponding bearing elements in order to accommodate and mount the rotation axis 44, pointing towards the star wheel axis. A further alternative exemplification comprises a suitable elastic transition element being provided in the transition region of the clamp arms 33a, 33b, which allows for a corresponding pivoting of the clamp jaws 37 about a horizontal axis.

In this situation, it is of major significance that the pivoting movement is limited in the exemplifications, and that the contact surfaces of the clamp jaws 37 in the inactive empty setting, i.e. without containers, lie immediately opposite or essentially immediately opposite one another. In at least one possible exemplification, a resetting force is induced, in order to establish the neutral zero setting with optimum location and orientation of the clamp jaws 37 and their respective contact surfaces.

The clamp arms 33a, 33b, with the rotatable clamp jaws 37, therefore prevent and/or restrict and/or minimize, possibly effectively, a movement of the container 3 which has been taken up in a radial direction A of the transport star wheel 29, while, by means of the star wheel pocket 4 formed by the format parts 1, 2 of the lower plane, a movement of the container 3 arranged in the star wheel pocket, transverse to the radial direction B, is also blocked.

The clamp jaws 37 represented in FIG. 5 and FIG. 6 are configured as half-shell or with a U-shaped profile. In this situation, the limbs of the U-profile point in the radial direction outwards. The lower limb is configured as a gripping limb 45a for gripping around the container 3, and extends in its length in the radial direction opposite the upper support limb 45b perceptibly further outwards. While the contact surface 42 is arranged at the support limb 45b, the gripping limb 45a comprises an arc-shaped contact surface 46, which is configured such as to grip around the container 3, in one possible exemplification a bottle, in sections.

In one possible exemplification, with the use of bottles with tapering shapes, the rotatable mounting of the clamp jaws by means of the rotation axes 44 is possible, since, at the closing of the container clamps 34, i.e. when an arc-shaped contact surface 46 of the gripping limb 45a and the contact surface 42 of the support limb 45b come in contact with the outer wall of the bottle, an automatic slight pivoting movement of the clamp jaw 37 about the rotation axis takes place, such that both the contact surface 42 as well as the arc-shaped contact surface 46 are in secure contact on the outer wall of the bottle, and the gripping limb 45a engages in sections around the bottle. In other words, since some containers have a tapered neck or neck portion, that is, the neck or neck portion gradually becomes smaller in diameter from the body to the mouth of the container, the outer surface of the container is angled or sloped with respect to the clamp jaws 37. In order to promote as complete a contact as possible between the clamp jaws 37 and the sloped outer surface of the container, the clamp jaws 37 can rotate or pivot about the axis 44, such that the contact surfaces of the clamp jaws 37 are oriented to essentially follow the sloped outer surface of the container. Such a design allows the clamp jaws 37 to clamp containers that have outer surfaces having different angles or slopes with respect to the clamp jaws 37.

Figure 7:
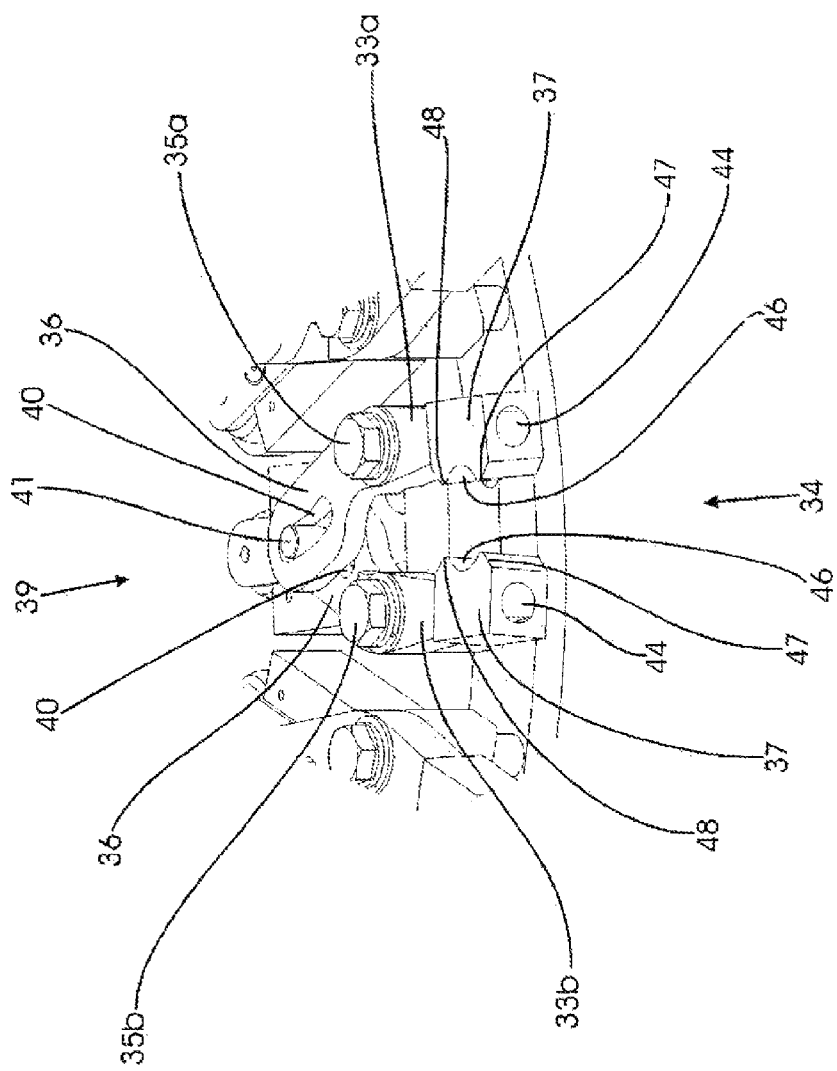
FIG. 7 shows schematically, in a perspective representation, an alternative exemplification of the clamp jaws represented in FIG. 5 and FIG. 6.

FIG. 7 shows a container clamp 34 with an alternative exemplification of the clamp jaws 37. In this case, these are not configured as half-shells, i.e. with a U-shaped profile, but as a block with cut-out apertures 46, arc-shaped in cross-section and pointing inwards, for coming in contact with the container 3. The clamp jaws 37 are mounted on the clamp arms 33a, 33b, corresponding to the clamp jaws 47 represented in FIG. 5 and FIG. 6, such as to rotate about a rotation axis 44.

The pivot movement of the clamp jaws 37 about the rotation axis 44 takes place automatically with the coming in contact of the arc-shaped cut-out apertures 46 and, respectively, of the contact surface of the respective cut-out profile, with a drink container 3. In this situation, the clamp jaws 37 grip with a front end 47 around the drink container 3 at least in sections, and stabilize this in the radial direction outwards, while conversely it supports the drink container 3 with an end 48 of the arc-shaped cut-out aperture 46, directed inwards, and blocks a movement in the radial direction inwards.

The clamp arms 33a, 33b of the container clamps 34, according to the exemplifications from FIG. 5 and FIG. 6, can be pivoted about their rotation axes 35a, 35b. The pivot movement can be initiated by means of a control curve, which takes effect on the adjustment device 39. The adjustment device 39 comprises, according to the exemplifications in FIG. 5 and FIG. 6, in the free ends 36 of the clamp arms 33a, 33b, pointing inwards, in each case a link guide 40, which are coupled to one another by means of a link bolt 41. Overall, the said container clamp 34 can be provided alone with a corresponding transport star wheel 29, such that the upper plane 20 is equipped with a plurality of such container clamps 34.

One feature or aspect of an exemplification is believed at the time of the filing of this patent application to possibly reside broadly in a device for the transport of containers 3, in a rotary manner, the device comprising a turntable which has format parts 1, 2, 17, 18, which in turn comprise at their respective external circumferences a plurality of pocket-type cut-out apertures, jointly forming star wheel pockets 4 for receiving in each case one container 3 per star wheel pocket 4, wherein at least one of the format parts 1, 2, 17, 18 is rotatable in the circumferential direction relative to at least one other, the star wheel pockets 4 are jointly adjustable in respect of their amount of opening, characterized in that in each case two format parts 1, 2; 17, 18 disposed above one another comprise at least one control element 5, 6; 21, 22, wherein the control elements 5, 6; 21, 22 of the format parts 1, 2; 17, 18 are arranged directly or substantially directly above one another and exhibit an orientation, inclination, or deflection radius which is different to the radial direction, wherein at least one radially movable adjustment element 7, 24 is provided, which engages both into the control element 5, 6; 21, 22 of the one format part 1, 2; 17, 18 and into the control element 5, 6; 21, 22 of the other format part 1, 2; 17, 18, wherein the adjustment element 7; 24 can be connected to at least one actuation element 12; 33, by means of which the actuation element 12; 23 can be driven in the radial direction, directly or indirectly, wherein the at least one actuation element 12, 23 represents the radially running guide element.

Another feature or aspect of an exemplification is believed at the time of the filing of this patent application to possibly reside broadly in the device, wherein the respective control element 5, 6; 21, 22 is configured in each case as a slide block, which in each case is arranged in an extension 8; 25, which is arranged at an inner circumference of the respective format part 1, 2; 17, 18.

Yet another feature or aspect of an exemplification is believed at the time of the filing of this patent application to possibly reside broadly in the device, wherein the respective control elements 5, 6; 21, 22, seen in the radial direction, are oriented differently in the direction towards a middle point of the turntable.

Still another feature or aspect of an exemplification is believed at the time of the filing of this patent application to possibly reside broadly in the device, wherein the respective control elements 5, 6; 21, 22, seen in the radial direction, exhibit a curved or straight course.

A further feature or aspect of an exemplification is believed at the time of the filing of this patent application to possibly reside broadly in the device, wherein the control elements 5, 6; 21, 22 of two format parts 1, 2; 17, 18, disposed above one another, intersect.

Another feature or aspect of an exemplification is believed at the time of the filing of this patent application to possibly reside broadly in the device, wherein the adjustment element 7, 24 comprises a bolt 9, arranged on which are slide blocks 10, of which one slide block 10 engages into the one control element 5, 6; 21, 22 and the other slide block 10 engages into the other control element 5, 6; 21, 22.

Yet another feature or aspect of an exemplification is believed at the time of the filing of this patent application to possibly reside broadly in the device, wherein the adjustment element 7; 24 can be connected to an actuation element 12; 23 with an outer thread 13 which engages into a threaded hole of the adjustment element 7; 24, wherein the actuation element 12; 23 is mounted on a rigid retention element 14.

Still another feature or aspect of an exemplification is believed at the time of the filing of this patent application to possibly reside broadly in the device, wherein a spindle drive is formed.

A further feature or aspect of an exemplification is believed at the time of the filing of this patent application to possibly reside broadly in the device, comprising a rigid retention element 14, arranged on which are two actuation elements 12, 23, such that two planes 19, 20 of format parts 1, 2; 17, 18 can be rotated.

Another feature or aspect of an exemplification is believed at the time of the filing of this patent application to possibly reside broadly in the device, wherein one single actuation element 12 is provided, which exhibits outer threads 13 at both its ends, and wherein one is formed as a left-hand thread and the other as a right-hand thread.

Yet another feature or aspect of an exemplification is believed at the time of the filing of this patent application to possibly reside broadly in the device, wherein, arranged above a first plane 19 with star wheel pockets 4, is a second plane 20 with container clamps 34.

Still another feature or aspect of an exemplification is believed at the time of the filing of this patent application to possibly reside broadly in the device, wherein each container clamp 34 comprises two clamp arms 33a, 33b, in each case with a clamp jaw 37 rotatable about a rotation axis 44 oriented in the longitudinal axial direction of the clamp arms 33a, 33b.

A further feature or aspect of an exemplification is believed at the time of the filing of this patent application to possibly reside broadly in the device, wherein each clamp jaw 33a, 33b comprises at least one gripping limb 45a for engaging around the container 3 and a supporting limb 45b for supporting the container 3.

One feature or aspect of an exemplification is believed at the time of the filing of this patent application to possibly reside broadly in the device, wherein the supporting limb 45b is shortened in relation to the gripping limb 45a.

The present application relates to a device for transporting containers 4, which device has a turntable having format parts 1, 2, 17, 18 which are disposed one above the other and have on their respective external circumference a plurality of star wheel pockets 4 for receiving a respective container 3, at least one of the format parts 1, 2, 17, 18 being rotatable in the circumferential direction relative to at least one other, such that an amount of opening of the star wheel pockets 4 can be adjusted. According to the present application, in each case two format parts 1, 2; 17, 18 disposed one above the other each have at least one control element 5, 6; 21, 22, wherein the control elements 5, 6; 21, 22 of format parts 1, 2; 17, 18 disposed directly one above the other have a different orientation, wherein an adjusting element 7, 24 is provided which engages both in the control element 5, 6; 21, 22 of one format part 1, 2; 17, 18 and in the control element 5, 6; 21, 22 of the other format part 1, 2; 17, 18.

The components disclosed in the patents, patent applications, patent publications, and other documents disclosed or incorporated by reference herein, may possibly be used in possible exemplifications of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one exemplification of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various exemplifications may be used with at least one exemplification or all of the exemplifications, if more than one exemplification is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications, patent publications, and other documents cited herein, and in the Declaration attached hereto, are hereby incorporated by reference as if set forth in their entirety herein except for the exceptions indicated herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, patent applications, patent publications, and other documents which are included in this application and which are referred to in paragraphs which state "Some examples of . . . which may possibly be used in at least one possible exemplification of the present application . . . " may possibly not be used or useable in any one or more exemplifications of the application.

The sentence immediately above relates to patents, patent applications, patent publications, and other documents either incorporated by reference or not incorporated by reference.

The following patents, patent applications, patent publications, and other documents, except for the exceptions indicated herein, are hereby incorporated by reference as if set forth in their entirety herein except for the exceptions indicated herein, as follows: DE 103 52 885 A1, DE 694 05 650 T2, EP 0 629 569 B1, DE 690 11 749 T2, EP 0 401 698 B1, DE 31 43 511 A1, DE 34 16 654 A1, JP07-237745 A, EP 0 412 059 B1, EP 2 447 194 B1, DE 26 23 309, EP 1 529 745 B1, EP 0 355 971, and US2015/0091316 A1.

All of the patents, patent applications, patent publications, and other documents, except for the exceptions indicated herein, which were cited in the German Office Action dated Mar. 5, 2014, and/or cited elsewhere, as well as the German Office Action document itself, are hereby incorporated by reference as if set forth in their entirety herein except for the exceptions indicated herein, as follows: JP H06-271 056 A, having inventor ADACHI SHUICHI, and published on Sep. 27, 1994; DE 26 23 309 A1, having inventor BOREL YVES, published on Dec. 8, 1977; and GB 2 452 996 A, having the title "Adjustable star wheel", published on Mar. 25, 2009.

All of the patents, patent applications, patent publications, and other documents, except for the exceptions indicated herein, which were cited in the International Search Report dated Jun. 16, 2015, and/or cited elsewhere, as well as the International Search Report document itself, are hereby incorporated by reference as if set forth in their entirety herein except for the exceptions indicated herein, as follows: JPH10338342 A, having the title "ARTICLE TRANSFERRING DEVICE OF ROTARY TYPE", published on Dec. 22, 1998; US 2011/114454 A1, having the title "APPARATUS FOR TRANSFERRING CONTAINERS", published on May 19, 2011; JPS61211220 A, having title "STAR WHEEL", published on Sep. 19, 1986; US 2011/272246 A1, having title "Automated Adjustment System for Star Wheel", published on Nov. 10, 2011; and DE10050084 A1, having the English translation of the German title "Adjustable conveyor star for bottles etc. has device with first and second arms forming cells to engage around bottles", published on Aug. 30, 2001.

The corresponding foreign and international patent publication applications, namely, Federal Republic of Germany Patent Application No. 10 2013 113 292.8, filed on Dec. 2, 2013, having inventors Andreas FAHLDIECK, Andreas KRIEG, and Nils MALLITZKI, and DE-OS 10 2013 113 292.8 and DE-PS 10 2013 113 292.8, and International Application No. PCT/EP2014/076060, filed on Dec. 1, 2014, having WIPO Publication No. WO 2015/082381 and inventors Andreas FAHLDIECK, Andreas KRIEG, and Nils MALLITZKI, are hereby incorporated by reference as if set forth in their entirety herein, except for the exceptions indicated herein, for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications, patent publications, and other documents, except for the exceptions indicated herein, are hereby incorporated by reference as if set forth in their entirety herein except for the exceptions indicated herein.

The purpose of incorporating the corresponding foreign equivalent patent application(s), that is, PCT/EP2014/076060 and German Patent Application 10 2013 113 292.8, is solely for the purposes of providing a basis of correction of any wording in the pages of the present application, which may have been mistranslated or misinterpreted by the translator, and to provide additional information relating to technical features of one or more exemplifications, which information may not be completely disclosed in the wording in the pages of this application.

Statements made in the original foreign patent applications PCT/EP2014/076060 and DE 10 2013 113 292.8 from which this patent application claims priority which do not have to do with the correction of the translation in this patent application are not to be included in this patent application in the incorporation by reference.

Any statements about admissions of prior art in the original foreign patent applications PCT/EP2014/076060 and DE 10 2013 113 292.8 are not to be included in this patent application in the incorporation by reference, since the laws relating to prior art in non-U.S. Patent Offices and courts may be substantially different from the Patent Laws of the United States.

All of the references and documents cited in any of the patents, patent applications, patent publications, and other documents cited herein, except for the exceptions indicated herein, are hereby incorporated by reference as if set forth in their entirety herein except for the exceptions indicated herein. All of the patents, patent applications, patent publications, and other documents cited herein, referred to in the immediately preceding sentence, include all of the patents, patent applications, patent publications, and other documents cited anywhere in the present application.

Words relating to the opinions and judgments of the author of all patents, patent applications, patent publications, and other documents cited herein and not directly relating to the technical details of the description of the exemplifications therein are not incorporated by reference.

The words all, always, absolutely, consistently, preferably, guarantee, particularly, constantly, ensure, necessarily, immediately, endlessly, avoid, exactly, continually, expediently, ideal, need, must, only, perpetual, precise, perfect, require, requisite, simultaneous, total, unavoidable, and unnecessary, or words substantially equivalent to the above-mentioned words in this sentence, when not used to describe technical features of one or more exemplifications of the patents, patent applications, patent publications, and other documents, are not considered to be incorporated by reference herein for any of the patents, patent applications, patent publications, and other documents cited herein.

The description of the exemplification or exemplifications is believed, at the time of the filing of this patent application, to adequately describe the exemplification or exemplifications of this patent application. However, portions of the description of the exemplification or exemplifications may not be completely applicable to the claims as originally filed in this patent application, as amended during prosecution of this patent application, and as ultimately allowed in any patent issuing from this patent application. Therefore, any statements made relating to the exemplification or exemplifications are not intended to limit the claims in any manner and should not be interpreted as limiting the claims in any manner.

The details in the patents, patent applications, patent publications, and other documents cited herein may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the exemplification or exemplifications, and the claims as originally filed in this patent application, and as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72(b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The exemplifications of the invention described herein above in the context of the preferred exemplifications are not to be taken as limiting the exemplifications of the invention to all of the provided details thereof, since modifications and variations thereof may be made without departing from the spirit and scope of the exemplifications of the invention.

AT LEAST PARTIAL LIST OF NOMENCLATURE

1 Format part
2 Format part
3 Container
4 Star table
5 Control element
6 Control element
7 Control element
8 Extension (also 8a, 8b)
9 Bolt
10 Slide block
11 Tensioning device
12 Actuation element
13 Outer thread
14 Retention element
15 Actuation end
16 Hand wheel
17 Format part
18 Format part
19 Lower plane
20 Upper plane
21 Control element
22 Control element
23 Actuation element
24 Adjustment element
25 Extension
26 Blocking element
27 Longitudinal hole
28 Spacer element
29 Transport star wheel
30a, 30b Clamp arms
31 Free end of clamp arm
32 Protective cap
33a, 33b Clamp arms
34 Container clamp
35a, 35b Rotation axes of clamp arms
36 Free end of clamp arm
37 Clamp jaws
38 Control arm
39 Adjustment device
40 Link guide 41 Contact surfaces
42 Link bolt
43 Gripper section
44 Rotation axis for clamp jaws
45a Gripping limb
45b Support limb
46 Arc-shaped contact surface
47 Outward facing end of contact surface
48 Inward facing end of contact surface
MA Machine axis

What is claimed is:

1. Device for the transport of containers, in a rotary manner, the device comprising a turntable which has format parts, which in turn comprise at their respective external circumferences a plurality of pocket-type cut-out apertures, jointly forming star wheel pockets for receiving in each case one container per star wheel pocket, wherein at least one of the format parts is rotatable in the circumferential direction relative to at least one other, the star wheel pockets are jointly adjustable in respect of their amount of opening, wherein in each case two format parts disposed above one another comprise at least one control element, wherein the control elements of the format parts are arranged directly above one another and exhibit an orientation, inclination, or deflection radius which is different to the radial direction, wherein at least one radially movable adjustment element is provided, which engages both into the control element of the one format part and into the control element of the other format part, wherein the adjustment element can be connected to at least one actuation element, by means of which the actuation element can be driven in the radial direction, directly or indirectly, wherein the at least one actuation element represents the only radially running guide element.

2. Device according to claim 1, wherein the respective control element is configured in each case as a slide block, which in each case is arranged in an extension, which is arranged at an inner circumference of the respective format part.

3. Device according to claim 2, wherein the respective control elements, seen in the radial direction, are oriented differently in the direction towards a middle point of the turntable.

4. Device according to claim 3, wherein the respective control elements, seen in the radial direction, exhibit a curved or straight course.

5. Device according to claim 4, wherein the control elements of two format parts, disposed above one another, intersect.

6. Device according to claim 5, wherein the adjustment element comprises a bolt, arranged on which are slide blocks, of which one slide block engages into the one control element and the other slide block engages into the other control element.

7. Device according to claim 6, wherein the adjustment element can be connected to an actuation element with an outer thread which engages into a threaded hole of the adjustment element, wherein the actuation element is mounted on a rigid retention element.

8. Device according to claim 7, wherein a spindle drive is formed.

9. Device according to claim 8, wherein a rigid retention element, arranged on which are two actuation elements, such that two planes of format parts can be rotated.

10. Device according to claim 8, wherein only one single actuation element is provided, which exhibits outer threads at both its ends, and wherein one is formed as a left-hand thread and the other as a right-hand thread.

11. Device according to claim 10, wherein, arranged above a first plane with star wheel pockets, is a second plane with container clamps.

12. Device according to claim 11, wherein each container clamp comprises two clamp arms, in each case with a clamp jaw rotatable about a rotation axis oriented in the longitudinal axial direction of the clamp arms.

13. Device according to claim 12, wherein each clamp jaw comprises at least one gripping limb for engaging around the container and a supporting limb for supporting the container.

14. Device according to claim 13, wherein the supporting limb is shortened in relation to the gripping limb.

15. A rotary container transport device comprising:
a turntable being rotatable about a machine axis;
said turntable comprising a plurality of container pockets disposed about the periphery of said turntable, and being configured to receive and hold containers;
said turntable comprising a first format part and a second format part, disposed one above the other, each of which comprises a plurality of pocket openings disposed about the periphery thereof;
each of said container pockets being formed by a pair of said pocket openings, one from each of said format parts;
at least one of said first and second format parts being rotatable with respect to the other;
said first format part comprising a first control element, and said second format part comprising a second control element;
said first and second control elements being disposed one above the other and being oriented at a transverse angle or curvature with respect to a radius of said machine axis;
an adjustment element being configured and disposed to engage both said first and second control elements; and
an actuation element being configured and disposed to move said adjustment element in a radial direction to thereby engage said first and second control elements and cause a rotational movement of at least one of said first and second format parts, to thereby adjust the relative position of said pocket openings, and to thereby adjust the width and/or depth of said container pockets.

16. The rotary container transport device according to claim 15, wherein each of said first and second format parts, when viewed along said machine axis, have essentially similar profiles, and said pocket openings are of similar size and shape.

17. The rotary container transport device according to claim 15, wherein:
said first control element comprises a first elongated slot, and said second control element comprises a second elongated slot; and
said adjustment element comprises:
a first engagement portion disposed in said first elongated slot;
a second engagement portion disposed in said second elongated slot; and
a body portion disposed between and to connect said first engagement portion and said second engagement portion.

18. The rotary container transport device according to claim 17, wherein each of said format parts is essentially ring-shaped, and each of said control elements is disposed on an extending portion that extends into the interior of said ring-shaped format part.

19. The rotary container transport device according to claim 18, wherein said adjustment element comprises a clamping device configured to be engaged to exert a force on said engagement portions to lock said engagement portions in place by frictional resistance with said slots, and configured to be disengaged to permit movement of said adjustment element and permit a rotational movement of at least one of said first and second format parts.

20. A method of transporting containers using a rotary container transport device comprising a turntable, which turntable comprises first and second format parts are disposed one above the other and each comprises a plurality of pocket openings disposed about the periphery thereof, said method comprising the steps of:

positioning said first format part and said second format part with respect to one another, and thereby forming a plurality of container pockets from pairs of said pocket openings;

receiving and holding containers of a first body size with said plurality of container pockets;

moving said containers by rotating said turntable about a machine axis;

actuating an actuation element and thereby moving an adjustment element in a radial direction;

engaging, with said adjustment element, both a first control element of said first format part and a second control element of said second format part, which control elements are disposed one above the other and are oriented at a transverse angle or curvature with respect to a radius of said machine axis;

causing a relative rotational movement of said first and second format parts, and thereby adjusting the relative position of said pocket openings, and thereby adjusting the width and/or depth of said container pockets to form different-sized container pockets; and receiving and holding containers of a second body size different from said first body size with said plurality of different-sized container pockets.

\* \* \* \* \*